United States Patent
Cha et al.

(10) Patent No.: US 10,567,545 B2
(45) Date of Patent: Feb. 18, 2020

(54) METHOD AND APPARATUS FOR SHARING DATA QUOTA

(71) Applicant: Samsung Electronics Co., Ltd., Gyeonggi-do (KR)

(72) Inventors: Jungyoon Cha, Seoul (KR); Hyunwoo Kim, Gyeonggi-do (KR); Heonyong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/583,089

(22) Filed: Dec. 24, 2014

(65) Prior Publication Data

US 2015/0189043 A1    Jul. 2, 2015

(30) Foreign Application Priority Data

Dec. 27, 2013 (KR) .................. 10-2013-0164798

(51) Int. Cl.
*G06F 15/16* (2006.01)
*H04L 29/08* (2006.01)

(52) U.S. Cl.
CPC .............. *H04L 67/32* (2013.01); *H04L 67/22* (2013.01)

(58) Field of Classification Search
CPC ............................... H04L 67/22; H04L 67/32
USPC ......................................................... 709/219
See application file for complete search history.

(56) References Cited

U.S. PATENT DOCUMENTS

| | | | |
|---|---|---|---|
| 9,219,825 B2 * | 12/2015 | Sheikh Naziruddin | H04M 15/7652 |
| 2006/0141994 A1 * | 6/2006 | Fratti | H04M 3/2218 455/414.1 |
| 2008/0096524 A1 * | 4/2008 | True | H04L 12/1457 455/406 |
| 2009/0282127 A1 * | 11/2009 | Leblanc | H04L 47/822 709/219 |
| 2010/0031157 A1 * | 2/2010 | Neer | G06Q 10/06 715/738 |
| 2010/0279672 A1 | 11/2010 | Koskela et al. | |
| 2012/0143978 A1 * | 6/2012 | Coussemaeker | H04W 12/08 709/208 |

(Continued)

FOREIGN PATENT DOCUMENTS

| | | |
|---|---|---|
| CN | 102740264 A | 10/2012 |
| CN | 103179500 A | 6/2013 |

(Continued)

OTHER PUBLICATIONS

Jung et al. . 2010. User-profile-driven collaborative bandwidth sharing on mobile phones. In Proceedings of the 1st ACM Workshop on Mobile Cloud Computing & Services: Social Networks and Beyond (MCS '10). ACM, New York, NY, USA, Article 2 , 9 pg (Year: 2010).*

(Continued)

*Primary Examiner* — Taylor A Elfervig

(57) ABSTRACT

A method of sharing a data quota in an electronic device includes grouping the electronic device and at least one other electronic device for sharing the data quota, selecting a sharing electronic device among the at least one other electronic device, through which to download data from a server, and receiving the download. Other embodiments including a server and an apparatus for sharing a data quota between electronic are also disclosed.

7 Claims, 9 Drawing Sheets

(56) References Cited

U.S. PATENT DOCUMENTS

| | | | |
|---|---|---|---|
| 2013/0254264 A1* | 9/2013 | Hankinson | H04L 29/06047 709/203 |
| 2013/0331028 A1* | 12/2013 | Kuehnel | H04W 76/02 455/41.1 |
| 2014/0068212 A1* | 3/2014 | Lin | H04M 15/58 711/162 |
| 2015/0120865 A1 | 4/2015 | Lee et al. | |
| 2015/0133049 A1 | 5/2015 | Lee et al. | |

FOREIGN PATENT DOCUMENTS

| | | |
|---|---|---|
| CN | 103281785 A | 9/2013 |
| JP | 2007036912 A | 2/2007 |
| KR | 10-2012-0059693 | 6/2012 |
| KR | 101213120 B1 | 12/2012 |
| WO | WO 2013169043 A1 | 11/2013 |
| WO | WO 2013187637 A1 | 12/2013 |

OTHER PUBLICATIONS

International Search Report dated Mar. 20, 2015 in connection with PCT International Application No. PCT/KR2014/012605; 3 pages.
China National Intellectual Property Administration, "The First Office Action," Application No. CN201480071211.2, dated Jan. 11, 2019, 26 pages.

* cited by examiner

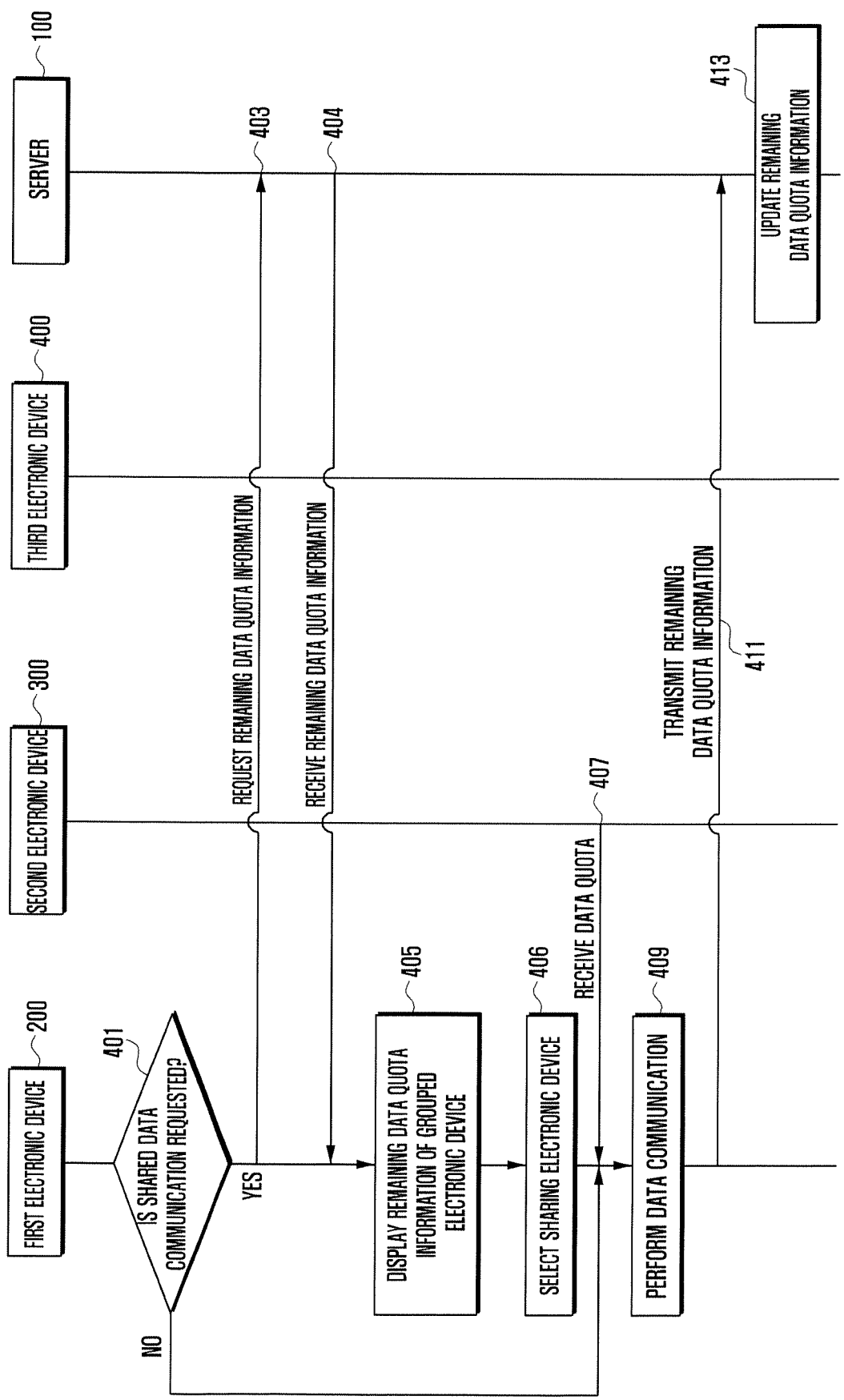

METHOD AND APPARATUS FOR SHARING DATA QUOTA

CROSS-REFERENCE TO RELATED APPLICATION AND CLAIM OF PRIORITY

The present application is related to and claims priority from and the benefit under 35 U.S.C. § 119(a) of Korean Patent Application No. 10-2013-0164798, filed on Dec. 27, 2013, which is hereby incorporated by reference for all purposes as if fully set forth herein.

TECHNICAL FIELD

Various embodiments of the present invention relate to a method and an apparatus in which a plurality of electronic devices use a data quota by sharing the data quota.

BACKGROUND

An electronic device may perform a data communication with another electronic device. Another electronic device may be configured with a server, a smart phone, a smart TV, etc. the data communication may be performed in a manner such as $3^{rd}$ Generation (3G), $4^{rd}$ Generation (4G), or the like. In the data communication of the electronic device, a predetermined data quota is assigned from a communication service provider to the electronic device, and the electronic device uses the assigned data quota. The electronic device may perform the data communication within a limit of the provided data quota. When the electronic device uses all of the provided data quota, the electronic device may not perform the data communication. This is because the electronic device uses up the provided data quota. As described above, when a user uses up the provided data quota, finally, the user cannot perform the data communication any more, and the user should pay an additional fee in order to perform the data communication.

SUMMARY

When a data quota is used up, an electronic device needs to share a data quota with another electronic device so as not to pay additional fee. Thus, a method and an apparatus capable of sharing a data quota with another electronic device are proposed.

A method of sharing a data quota in an electronic device includes grouping the electronic device and at least one other electronic device for sharing the data quota, selecting a sharing electronic device among the at least one other electronic device, through which to download data from a server, and receiving the download.

In some embodiments, the method further includes transmitting a shared data communication request signal to the server, and receiving remaining data quota of electronic devices in group from the server.

In some embodiments, the method further includes receiving a remaining data quota of other electronic device in the group.

In some embodiments, the sharing electronic device downloads data from a network when a download request is received from another electronic device in the group, and transmits the remaining data quota information to the server when the data downloading is completed.

In some embodiments, the method further includes forming a tethering communication link with the sharing communication electronic device.

In some embodiments, selecting the sharing electronic device includes selecting an electronic device with a largest remaining data quota, and selecting an electronic device with a second largest remaining data quota, when the electronic device with the largest remaining data is not available.

In some embodiments, the method includes receiving the remaining data quota information of the electronic devices in the group upon a request or a periodical basis.

In some embodiments, the sharing electronic device has a data usage quota equal to or larger than a size data to be downloaded.

In some embodiments, the method includes transferring grouping information to the server, wherein the grouping information indicates electronic devices forming the group to share data usage quota in between.

In some embodiments, the method includes transmitting the remaining data quota information to the server when the shared data communication is completed.

A method of sharing a data quota between electronic devices in a server includes receiving grouping information identifying electronic devices forming a group for sharing the data quota and remaining data quotas of the electronic devices, from one of the electronic device; storing the grouping information and the remaining data quotas of the grouped electronic device; transmitting the remaining data quota information of other electronic device in the group to a requesting electronic device upon receiving a request for sharing data quota, and updating the remaining data quota information when the remaining data quota information is received from the other electronic device.

An apparatus for sharing a data quota in an electronic device includes a wireless communication unit configured to: transmit or receive a signal, a processor configured to group the electronic device and at least one other electronic device for sharing the data quota, select a sharing electronic device among the at least one other electronic device, through which to download data from a server, and receive the downloaded data from the sharing electronic device via the wireless communication unit.

A server for supporting a data quota sharing between electronic devices includes an wireless communication unit configured to store the grouping information and the remaining data quotas of the grouped electronic device, transmit the remaining data quota information of other electronic device in the group to a requesting electronic device upon receiving a request for sharing data quota, and update the remaining data quota information when the remaining data quota information is received from the other electronic device.

One of advantageous effects according to various embodiments of the present invention is that an electronic device can perform a data communication by receiving a data quota from a terminal of which usable remaining data is the largest among grouped electronic devices. Therefore, the electronic device can share a usable data quota between grouped electronic devices regardless of a determined communication service provider. Thus, although data provided to a user's electronic device is used up, the user can conveniently use a data communication by receiving a data quota from another grouped electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a view for describing a method of performing the data communication by receiving the data quota by the electronic device according to an embodiment of the present invention;

DETAILED DESCRIPTION

Figure 1:
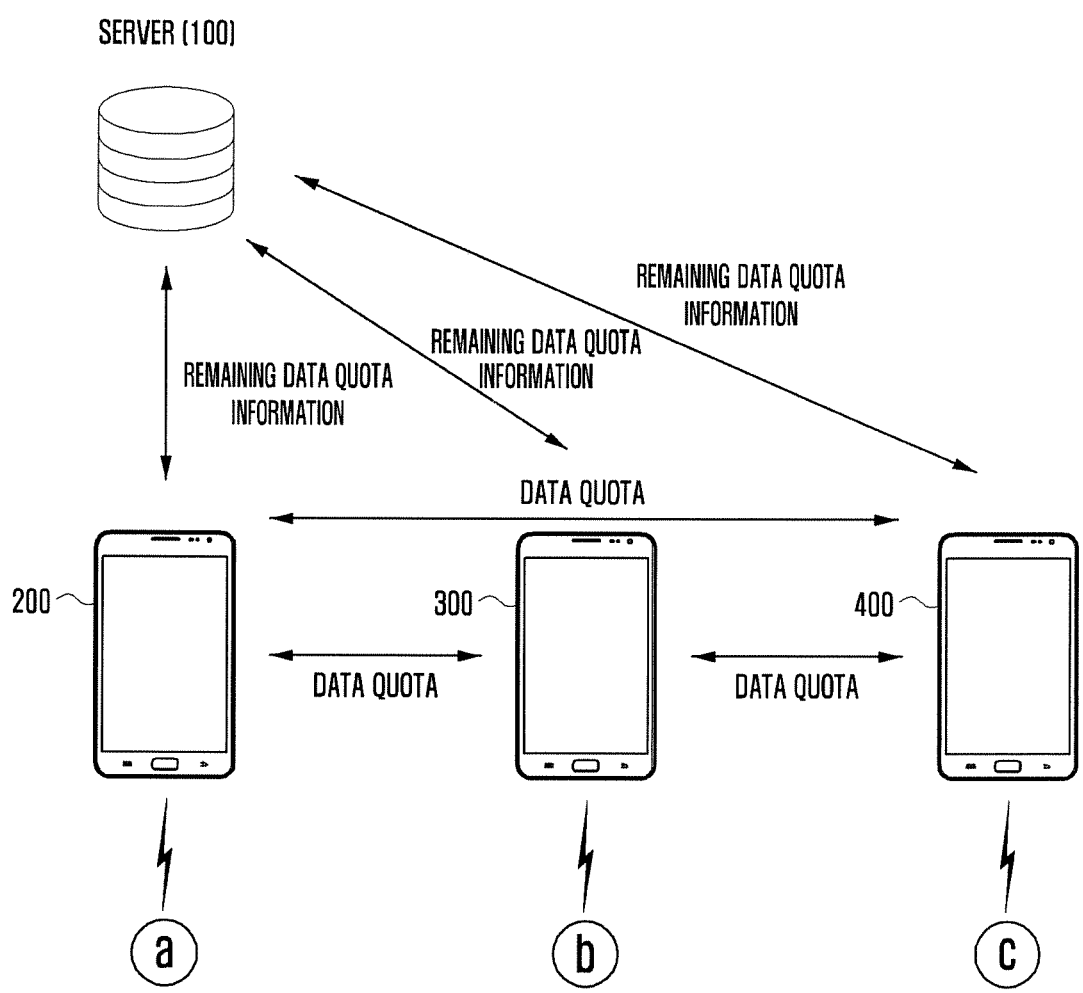
FIG. 1 is a view illustrating a schematic configuration between the electronic devices for sharing a data quota according to an embodiment of the present invention.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments will be described in detail with reference to the accompanying drawings. It should be noted that the same elements will be designated by the same reference numerals although they are shown in different drawings. Further, a detailed description of a known function and configuration which may make the subject matter of the present invention unclear will be omitted. Hereinafter, it should be noted that only the descriptions will be provided that may help understanding the operations provided in association with the various embodiments of the present invention, and other descriptions will be omitted to avoid making the subject matter of the present invention rather unclear.

In an embodiment of the present invention, a term referred to as 'grouping' means setting one group so that an electronic device shares a data quota, which is provided from a determined communication service provider, with another electronic device. Another electronic device may be an electronic device using a communication service provider equal to or different from that of the electronic device.

In an embodiment of the present invention, a term referred to as 'data quota' means a thing for performing a wireless data communication by the electronic device. The electronic device receives a certain data quota corresponding to a certain fee from a determined communication service provider every month. Thus, the electronic device possesses the provided certain data quota. The electronic device may consume the data quota in proportion to a kind, a speed and the like of a data communication, as the electronic device performs the data communication.

In an embodiment of the present invention, a term referred to as 'remaining data information' means a remaining data quota among the data quota provided from the determined communication service provider to the grouped electronic device. The electronic device may perform the data communication according to the possessed data quota, based on the remaining data information. Since the electronic devices transmit their own remaining data information to a server, the server may store the remaining data information of the grouped electronic devices.

FIG. 1 is a view illustrating a schematic configuration for sharing the data quota between the electronic devices according to an embodiment of the present invention.

Referring to FIG. 1, a first electronic device 200 can transmit grouping information in which information of at least one another electronic device grouped with the first electronic device 200 for sharing the data quota is included, to a server 100. Hereinafter, it is assumed that the first electronic device 200 is grouped with other electronic devices (e.g., a second electronic device 300 and a third electronic device 400). Thus, three electronic devices (the first electronic device 200, the second electronic device 300 and the third electronic device 400) are grouped into one group sharing the data quota. In addition, the second electronic device 300 can have remaining data larger than that of the third electronic device 400.

The first electronic device 200 can be 'a requesting electronic device' requesting the sharing of the data quota. On the other hand, the first electronic device 200 can also be 'a sharing electronic device' when receiving a data quota sharing request from another electronic device.

When the first electronic device 200 is the requesting electronic device, the electronic device 200 can request remaining data information of the grouped electronic devices (the second electronic device 300 and the third electronic device 400) to the server 100. The server 100 can transmit the remaining data information of the grouped electronic devices (the second electronic device 300 and the third electronic device 400) in response to the request of the remaining data information. The first electronic device 200 can select the sharing electronic device based on the received remaining data information. The first electronic device 200 can select the second electronic device 300 having the largest remaining data as the sharing electronic device, based on the received remaining data information. When the first electronic device 200 selects the sharing electronic device, the electronic device 200 can select an electronic device included within an area where a tethering connected between the first electronic device 200 and the selected electronic device is possible. Further, the first electronic device 200 forms a communication link with the second electronic device 300 through a tethering, and can perform a shared data communication. Here, the tethering can be a function enabling the electronic device and another electronic device to use a wireless internet by connecting the electronic device with another electronic device through a local area network communication such as USB, Bluetooth, Wi-Fi, a wireless LAN, etc.

The first electronic device 200 can form a communication link with a communication server of the second electronic device 300 through the tethering. The shared data communication can be performed through the communication link. In addition, the first electronic device 200 transmits the remaining data information of the second electronic device 300, which is the sharing electronic device on which the shared data communication is performed, to the server 100.

Each of the electronic devices receives a certain amount of data quota from a determined communication service provider every month, and possesses the received data quota. For example, the first electronic device 200 can receive a certain amount of data quota from 'A' communication service provider, the second electronic device 300 can receive a certain amount of data quota from 'B' communication service provider, and the third electronic device 400 can receive a certain amount of data quota from 'C' communication service provider. In addition, each of the electronic devices can receive the data quota by using a communication network of a determined communication service provider. The first electronic device 200 can perform the shared data communication by receiving the data quota from the second electronic device 300 regardless of the communication service provider used by the first electronic device 200.

As described above, the first electronic device 200 can be grouped with at least one other electronic device in a user setting step, in order to perform the shared data communication. In addition, the first electronic device 200 can transmit the grouping information in which the information of the grouped electronic devices is included, to the server 100. When the server 100 receives the grouping information, the server 100 stores the remaining data information of the grouped electronic devices. In addition, when a data communication is requested, the first electronic device 100 determines whether the requested data communication is the shared data communication. When it is determined that the requested data communication is the shared data communication, the first electronic device 200 can request the remaining data information of the other grouped electronic devices (the second electronic device 300 and the third electronic device 400) to the server 100. Here, the first electronic device 200 can be the requesting electronic device. Also, the first electronic device 200 can download the remaining data information of the grouped electronic devices (e.g., the second electronic device 300 and the third electronic device 400) from the server 100. The first electronic device 200 can analyze the downloaded remaining data information of the grouped electronic devices (e.g., the second electronic device 300 and the third electronic device 400). Next, the first electronic device 200 can select an electronic device (e.g., the second electronic device 300) having the largest data quota among the grouped electronic devices. The sharing electronic device can be automatically selected. Alternatively, the sharing electronic device can be selected by a user. In addition, the requesting electronic device (e.g., the first electronic device 200) forms the communication link with the selected sharing electronic device (e.g., the second electronic device 300) to perform the shared data communication.

Meanwhile, when the shared data communication is not requested, the first electronic device 200 can request information of the remaining data possessed by the first electronic device 200 to the server 100. Next, when the first electronic device 200 receives the information of the remaining data possessed by the first electronic device 200 from the server 100, the first electronic device 200 determines whether the remaining data possessed by the first electronic device 200 is equal to or smaller than predetermined remaining data. When the remaining data possessed by the first electronic device 200 is equal to or smaller than the predetermined remaining data, the first electronic device 200 can perform the shared data communication. Meanwhile, when the remaining data possessed by the first electronic device 200 is larger than the predetermined remaining data, the first electronic device 200 can perform the data communication by using thereof. The above processes are repeatedly preformed.

As described above, the first electronic device 200 forms the communication link with at least one other grouped electronic device (e.g., the second electronic device 200 or the third electronic device 400) to perform the shared data communication. That is, the shared data communication is a performance of the data communication by the electronic device (i.e. the requesting electronic device) by using the data quota of another grouped electronic device (i.e. the sharing electronic device).

In another embodiment, when the first electronic device 200 receives the shared data communication request from another grouped electronic device, the first electronic device 200 can request the remaining data information included in the server 100 to the server 100. Here, the remaining data information can be the remaining data information, of the grouped terminals, stored in the server, and the remaining data information can include the remaining data information of the first electronic device 200. Next, the first electronic device 200 can download the remaining data information from the server 100. When the remaining data possessed by the first electronic device 200 is equal to or larger than the determined remaining data, the first electronic device 200 can provide the data quota of the first electronic device 200 to another electronic device (e.g., the electronic device 300 or the third electronic device 400) requesting the shared data communication.

The server 100 can store the grouping information received from the first electronic device 200. In addition, the server 100 can also store the remaining data information of the grouped electronic devices 200, 300 and 400. In addition, the server 100 can receive the shared data communication requesting signal from the requesting electronic device (e.g., the first electronic device 200). The server 100 can transmit the remaining data information of the grouped electronic devices in response to the shared data communication requesting signal. When the server 100 receives the remaining data information according to the data communication performance of the grouped electronic devices, the server 100 can update the remaining data information.

Figure 2:
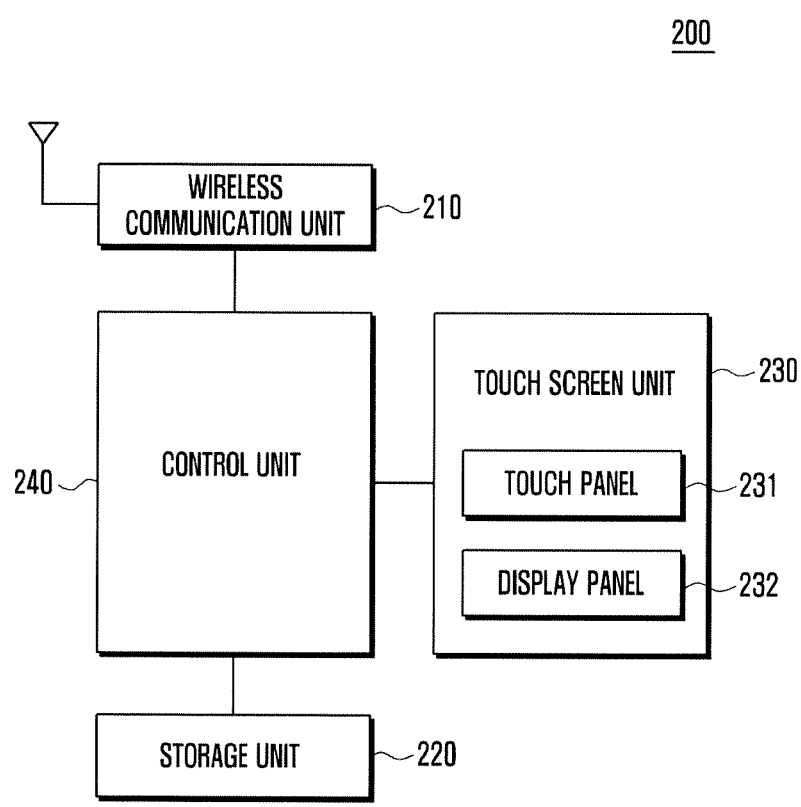
FIG. 2 is a view schematically illustrating a configuration of the electronic device according to an embodiment of the present invention.

FIG. 2 is a view schematically illustrating a configuration of the first electronic device 200 according to an embodiment of the present invention.

Hereinafter, as described above, the first electronic device 200 is the requesting electronic device requesting the data quota to another electronic device (e.g., the second electronic device 300 or the third electronic device 400).

Referring to FIGS. 1 and 2, the first electronic device 200 includes a wireless communication unit 210, a storage unit 220, a touch screen 230 and a control unit 240. Since the components illustrated in FIG. 2 are not necessary, the electronic device 200 according to the present invention can have more components or fewer components. For example, when the electronic device 200 according to an embodiment of the present invention does not support a separate communication function, the wireless communication unit 210 can be omitted.

The wireless communication 210 unit can include at least one module enabling a wireless communication between a user's device and a wireless communication system or between the user's device and a network where another user's device is positioned. For example, the wireless communication unit 210 can include a mobile communication module, a Wireless Local Area Network (WLAN) module, a short-range communication module, a location calculating module, a broadcast receiving module and the like. In particular, in the present invention, the wireless communication unit 210 can support a tethering connection between the grouped electronic devices in order to share the data quota. In addition, the wireless communication unit 210 can perform the data communication by using the data quota provided from the 'A' communication service provider in which the first electronic device 200 is subscribed. In addition, the wireless communication unit 210 transmits the remaining data information of the wireless communication unit 210 to the server 100.

The storage unit 220 can store a program for the first electronic device 200. Specifically, the storage unit 220 of the present invention stores the grouping information set by the user in the user's setting step. Here, the grouping information is information set as one group including at least one other terminal so as to share the data quota.

The touch screen 230 can include a touch panel 231 and a display panel 232.

When a user's input occurs, the touch panel 231 transfers the user's input to the control unit 240. The touch panel 231 can sense a request for performing the data communication. In addition, the touch panel 231 can sense the shared data communication request.

The display panel 232 displays the remaining data information of the electronic device and remaining data information of the grouped electronic devices provided from the server.

The control unit 240 controls overall operations of the first electronic device 200. Specifically, the control unit 240 of the present invention can be grouped with at least one other electronic device in the user's setting step so as to share the provided data quota. Also, the control unit 240 transmits the grouping information in which information of the grouped electronic devices is included to the server 100. When the shared data communication is determined, the control unit 240 requests the remaining data information of other grouped electronic devices to the server 100. The control unit 240 can receive the remaining data information of another grouped electronic device. Further, the control unit 240 can select the sharing electronic device based on the remaining data information of another grouped electronic device. The control unit 240 can select a terminal having the largest remaining data as the sharing electronic device, based on the received remaining data information. As it is assumed that in FIG. 1, the control unit 240 can select the electronic device having the largest remaining data as the sharing electronic device. Thus, the second electronic device 300 can be the sharing electronic device. At this time, when the second electronic device 300 does not activate a data sharing function, the control unit 240 can select the third electronic device 400 having the second largest remaining data as the sharing electronic device. The control unit 240 forms the communication link with the second electronic device 300 selected as the sharing electronic device to perform the shared data communication. The control unit 240 transmits the remaining data information according to the shared data communication performance to the server.

Figure 3A:
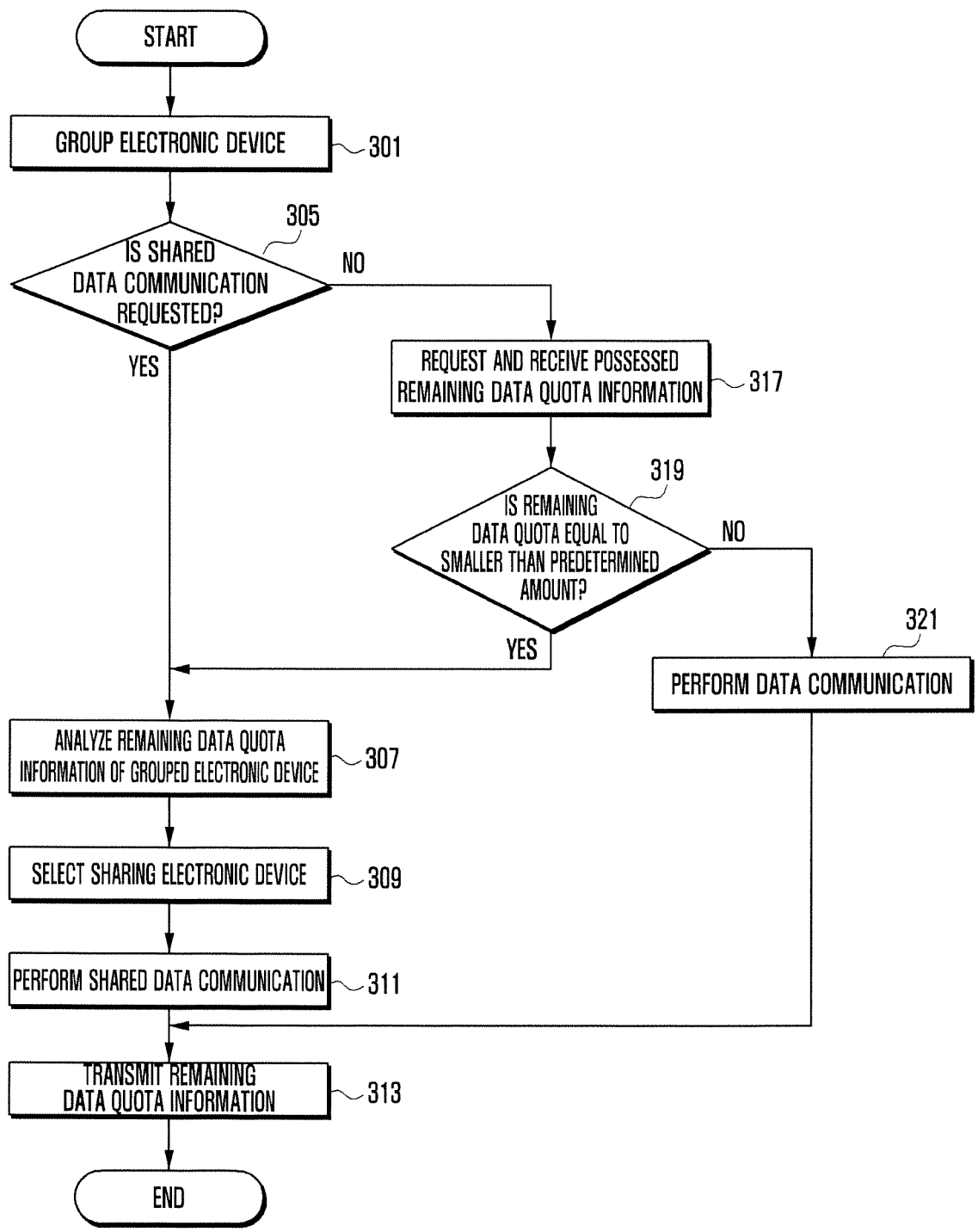
FIGS. 3A and 3B are flowcharts illustrating a procedure of performing a data communication by transmitting and receiving the data quota in the electronic device according to an embodiment of the present invention.

Meanwhile, when the control unit 240 determines that the data quota sharing is not request, the control unit 240 requests the remaining data information of the control unit 240 to the server 100 to receive the remaining data information of the control unit 240 from the server 100. At this time, the control unit 240 determines whether the remaining data of the control unit 240 is equal to or smaller than the predetermined remaining data, based on the information of the remaining data possessed by the control unit 240. Here, the predetermined remaining data is a level (i.e. an amount of data) of remaining data before the provided data quota is used up. When the remaining data possessed by the control unit 240 is equal to or smaller than the predetermined remaining data, the control unit 240 receives the data quota from another grouped electronic device to perform the shared data communication. Meanwhile, when the remaining data is equal to or larger than the predetermined remaining data, the control unit 240 uses the remaining data possessed by the control unit 240 to perform the data communication. FIG. 3A is a view illustrating a procedure of performing the data communication by transmitting and receiving the data quota in the electronic device according to an embodiment of the present invention.

Referring to FIG. 3A, the control unit 240 can be grouped with at least one electronic device in step 301. Specifically, the control unit 240 can be grouped with at least one other electronic device in order to share the data quota in the user's setting step. The control unit 240 can transmit the grouping information in which the information of the grouped electronic devices is included, to the server 100. At this time, the control unit 240 transmits the remaining data information together with the grouping information to the server 100. Thus, the server 100 can store the grouping information and the remaining data information.

Next, the control unit 240 determines whether the shared data communication request for sharing the data quota occurs in step 305. When the shared data communication request occurs, the control unit 240 can analyze the remaining data information of at least one grouped electronic device (e.g., the second electronic device 300 and the third electronic device 400) in step 307. Specifically, the control unit 240 can transmit a signal requesting the remaining data information of the grouped electronic devices (i.e. the second electronic device 300 and the third electronic device 400) to the server 100. Further, the control unit 240 can download the remaining data information of the grouped electronic devices 300 and 400 from the server 100.

Next, the control unit 240 can select the sharing electronic device for receiving the data quota through the tethering in step 309. At this time, the control unit 240 can select the terminal having the largest remaining data as the sharing electronic device, among the grouped electronic devices. When the data sharing function of the selected terminal is not activated, the control unit 240 can select the electronic device having the second largest remaining data as the sharing electronic device. For example, the remaining data of the second electronic device 300 can be 5 GB, the remaining data of the third electronic device 400 can be 3 GB, and the data sharing function of the second electronic device 300 can be activated. Thus, the control unit 240 can select the second electronic device 300 as the sharing electronic device, among at least one grouped electronic device.

In another embodiment, the control unit 240 can deactivate the data sharing function of the second electronic device 300. In this case, the control unit 240 can select the third electronic device 400 as the sharing electronic device.

The control unit 240 can form the communication link with the second electronic device 300 through the tethering in step 311. The control unit 240 uses the data quota of the second electronic device 300 to which the communication link is formed to perform the shared data communication. The control unit 240 transmits the remaining data information decreased according to the performance of the shared data communication to the server 100 in step 313.

Meanwhile, when the control unit determines that the data communication sensed in step 305 is not the shared data communication request, the control unit 240 can request the information of the remaining data possessed by the control unit 240 to the server 100 in step 317. The control unit 240 can receive the information of the remaining data possessed by the control unit 240 from the server 100 in response to the request. Next, the control unit 240 can determine whether the remaining data received from the server 100 is not greater than the predetermined amount in step 319. The control unit 240 determines that the control unit 240 performs the shared data communication according to its own remaining data information. Here, the predetermined amount can be a value set in the user's setting step. In addition, the predetermined amount can be a value set for limiting the data communication, when the data quota provided from the determined communication service provider is used up. In addition, the predetermined value can be set for displaying a notification message indicating usable remaining data before the data provided from the communication service provider is used up.

Meanwhile, when the remaining data determined based on the remaining data information of the control unit 240 is not greater than the predetermined amount, the control unit 240 can control to perform the shared data communication by progressing to in step 307. That is, the control unit 240 can request the remaining data information of the grouped electronic devices (i.e. the second electronic device 300 and the third electronic device 400) to the server 100. Next, the control unit 240 receives the remaining data information of the grouped electronic devices 300 and 400 from the server 100 and selects the sharing electronic device in step 309. Here, the sharing electronic device can be the second electronic device 300 having the largest remaining data. Next, the control unit 240 forms the communication link with the selected sharing electronic device through the tethering, and uses the data quota of the second electronic device 300 which is the selected sharing electronic device to perform the shared data communication.

Meanwhile, when the possessed remaining data is larger than the predetermined remaining data, the control unit 240 performs the data communication by using the data quota provided from the determined communication service provider in step 321. The control unit 240 transmits the remaining data information which includes a data quota used according to the data communication, to the server 100. At this time, the remaining data information can include used data quota information and information of the data quota remaining after using. Next, the server 100 can update the changed remaining data information.

Figure 3B:
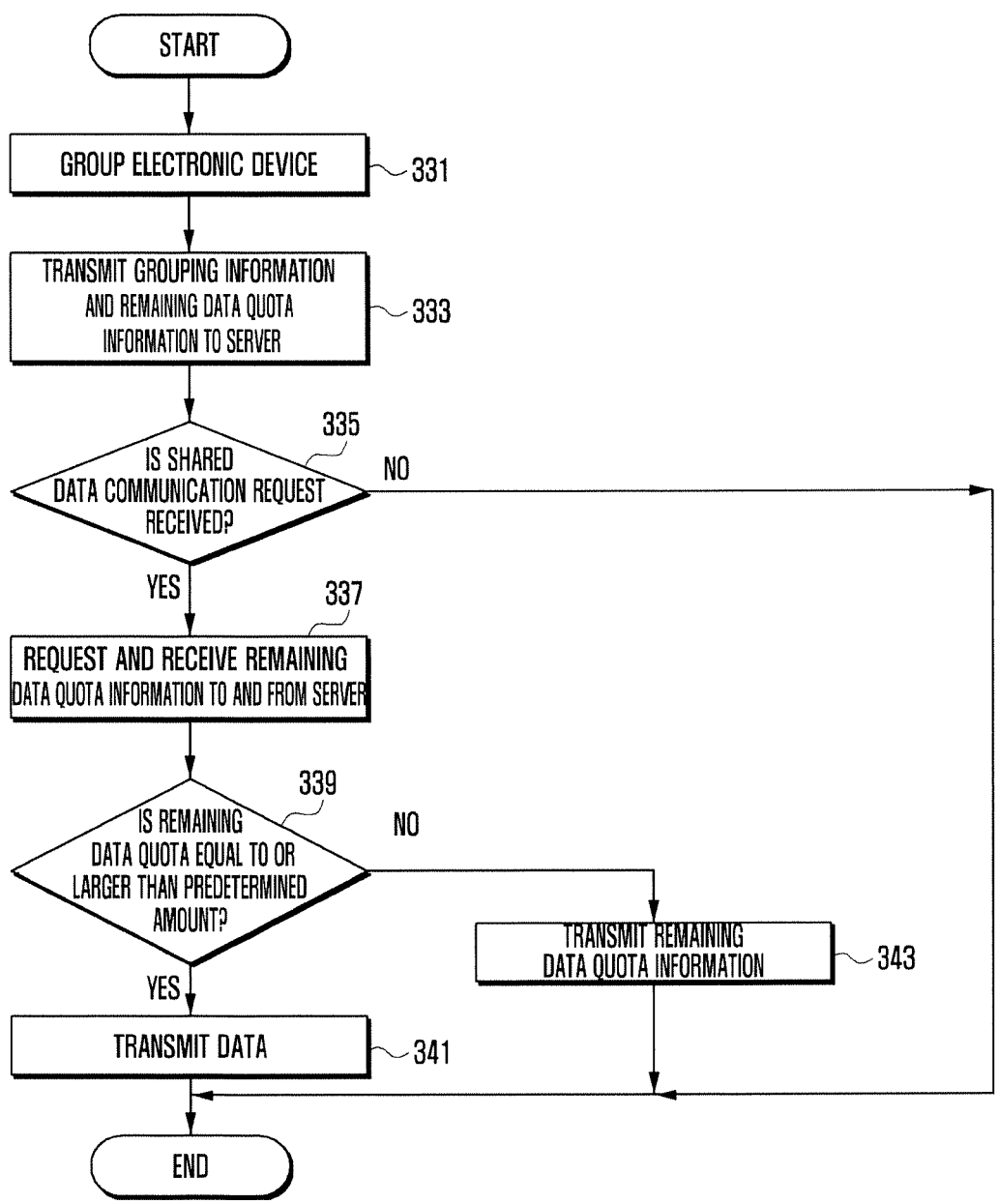

FIG. 3B is a view illustrating a procedure of transmitting the data quota when the electronic device receives the data quota request (i.e. when the electronic device becomes a sharing terminal) according to an embodiment of the present invention.

According to an embodiment, in FIG. 3B, the control unit 240 can receive the shared data communication request from a request terminal (e.g., the second electronic device 300).

Referring to FIG. 3B, the control unit 240 is grouped with the other electronic devices (e.g., the second electronic device 300 and the third electronic device 400) in step 331. The control unit 240 transmits the grouping information and the remaining data information of the grouped electronic devices to the server 100 in step 333. Next, the control unit 240 determines whether the shared data communication is requested from the second electronic device 300 among at least one grouped electronic device in step 335. Next, when the control unit 240 receives the shared data communication request from the second electronic device 300, the control unit 240 requests the remaining data information to the server 100 in correspondence to the shared data communication request and receives the information of the remaining data possessed by the control unit 240 from the server 100. Next, the control unit determines whether the remaining data is equal to or larger than the predetermined amount in step 339. Here, the predetermined amount can be a data quota set as a limit for performing the shared data communication in the user's setting step. When the remaining data determined based on the remaining data information received from the server 100 is equal to or larger than the predetermined remaining data, data is transmitted to the second electronic device 300 requesting the data in step 341. Meanwhile, when the possessed remaining data is not equal to or larger (i.e. equal to or smaller) than the predetermined remaining data, the control unit 240 transmits the remaining data information to the server 100 in order to inform of the shortage of the remaining data in step 343. Next, the second electronic device 300 which is the request terminal requests the data sharing to another grouped electronic device (e.g., the third electronic device 400).

FIG. 4 is a flowchart schematically illustrating a flow of the data sharing according to an embodiment of the present invention.

Referring to FIG. 4, the first electronic device 200 can determine whether the data communication request is the shared data communication request in step 401. When the shared data communication occurs, the first electronic device 200 can request the remaining data quota information of the grouped electronic devices to the server 100 in step 403. For example, the grouped electronic devices can include the second electronic device 300 and the third electronic device 400. The first electronic device 200 is in a state wherein the grouping information is transmitted to the server 100. Here, the grouping information includes the information of at least one other electronic device grouped with the first electronic device 200 for the data sharing. The server 100 can store the grouping information of the grouped electronic devices and the remaining data quota information. The first electronic device 200 can receive the remaining data quota information of the grouped electronic devices (i.e. the second and third electronic devices 300 and 400) from the server 100 in response to the request of the remaining data quota information in step 404. The first electronic device 200 can control to display the remaining data quota information of the grouped electronic devices 300 and 400 in step 405. Next, the first electronic device 200 selects the sharing electronic device for performing the shared data communication through the tethering process in step 406. Here, the sharing electronic device can be selected by the first electronic device 200, or can be selected by the user. The first electronic device 200 can select the sharing electronic device by receiving the user's input for choosing the sharing electronic device. In some embodiments, when the sharing electronic device is selected, the first electronic device 200 can select the terminal having the largest data quota among the grouped electronic devices 300 and 400. In addition, the first electronic device 200 can select the electronic device included in the area where the tethering is possible. Thus, as it is illustrated in FIG. 1, the first electronic device 200 selects the second electronic device 300 having the largest data quota as the sharing electronic device, among the grouped electronic devices included in the area where the tethering is possible. The sharing electronic device (i.e., the electronic device 300) can allow the first electronic device 200 to use the data quota of the second electronic device 300. Thus, the first electronic device 200 can form the communication link with the sharing electronic device (i.e., the second electronic device 300) through the tethering. The first electronic device 200 receives the data quota from the sharing electronic device (i.e., the second electronic device 300) through the communication link formed in step 407. The first electronic device 200 performs the shared data communication in step 409. That is, the shared data communication is the performance of the data communication by using the data quota of the second electronic device by the first electronic device 200. After the first electronic device 200 performs the shared data communication by receiving the data from the sharing electronic device, the first electronic device 200 transmits the remaining data information according to the performance of the shared data communication in step 411. When the server 100 receives the remaining data quota information from the first electronic device 200, the server 100 updates the remaining data quota information of the grouped and stored terminals in step 413.

Meanwhile, when the first electronic device 200 does not sense the shared data communication in step 401, the first electronic device 200 performs the data communication by using the data quota thereof in step 409. The first electronic device 200 transmits the remaining data quota according to the performance of the communication to the server 100 in step 417. At this time, the server 100 updates the remaining data quota information of the grouped electronic devices in step 419.

Figure 5:
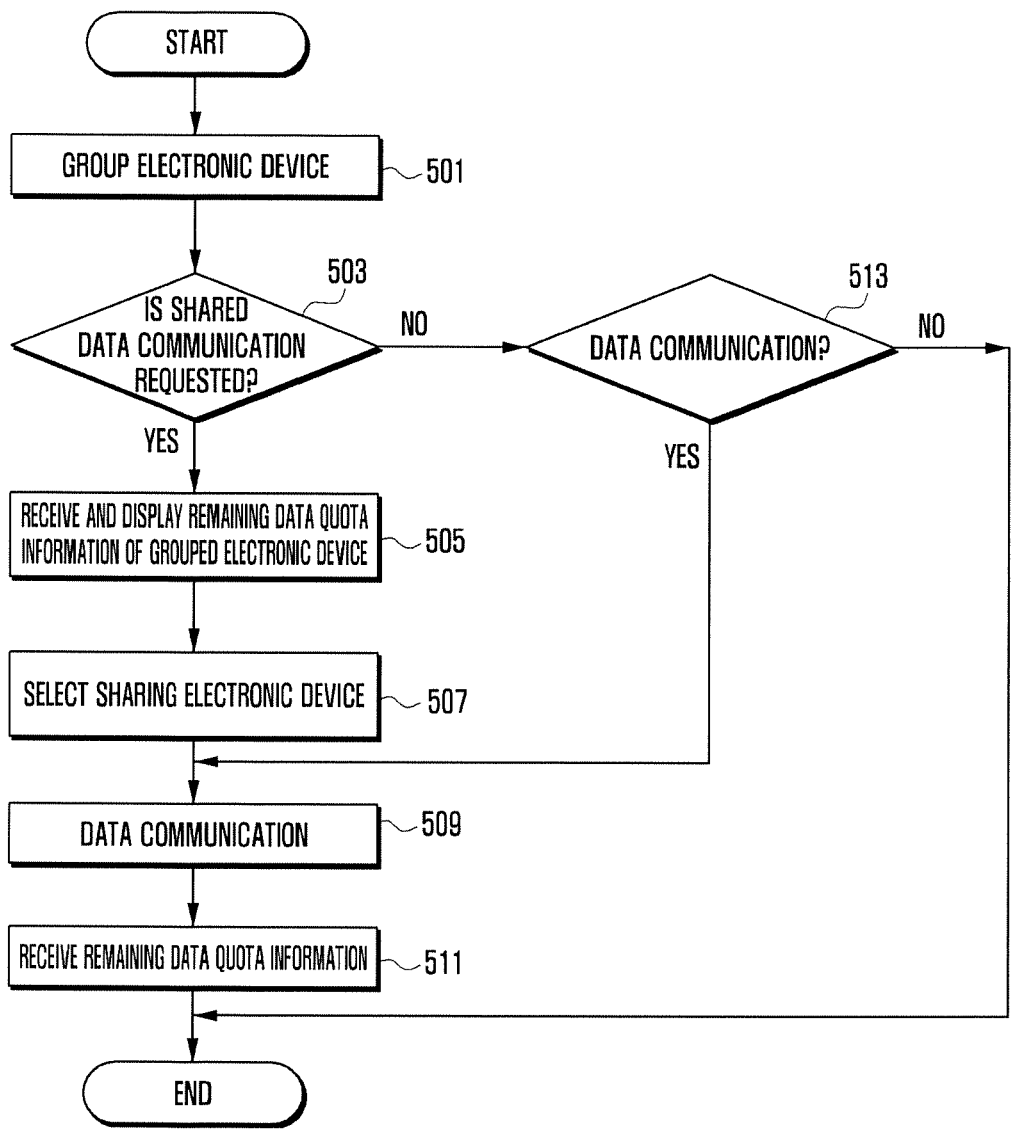
FIG. 5 is a flowchart for describing a procedure of performing the data communication by receiving the data quota by the electronic device according to an embodiment of the present invention.
Figure 6:
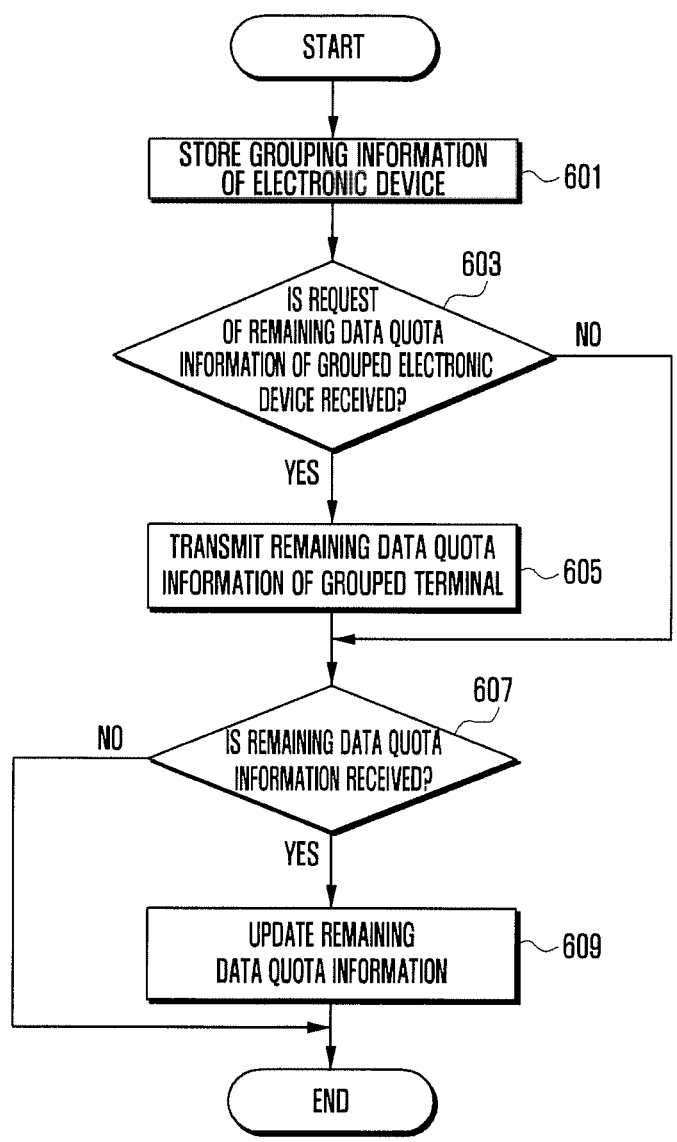
FIG. 6 is a flowchart for describing a procedure of responding to a request of the electronic device by a server according to an embodiment of the present invention.

FIG. 5 is a view illustrating a procedure of performing the data communication by receiving the data quota by the electronic device according to an embodiment of the present invention. FIG. 6 is a view illustrating a procedure of responding to the request of the electronic device by the server according to an embodiment of the present invention.

A procedure of sharing the data quota will be described in more detail with reference to FIGS. 5 and 6. In a description of the next embodiment, it is assumed that when the first electronic device 200 performs the data communication, the first electronic device 200 requests the data sharing, as the assumption of the FIG. 1.

Referring to FIG. 5, the control unit 240 can be grouped with other electronic devices to share the data quota in step 501. Next, the control unit 240 transmits the grouping information to the server 100. The control unit 240 determines whether the shared data communication is requested. When the shared data communication is requested, the control unit detects the shared data communication in step 503. The control unit 240 requests the remaining data information of the grouped electronic device.

The control unit 240 can display the received remaining data information of the grouped electronic device in step 505. The displaying of the remaining data information can be omitted.

The control unit 240 can determine the sharing electronic device for receiving data among the grouped electronic devices 300 and 400, while displaying the remaining data information of the grouped electronic devices (i.e. the second electronic device 300 and the third electronic device 400), in step 507. The electronic device included in the area where the tethering is possible can be selected as the sharing electronic device so as to receive the data quota through the tethering connection. In addition, the electronic device having the largest remaining data can be selected as the sharing electronic device. When the selected sharing electronic device does not activate the data sharing function, the control unit 240 can select another electronic device.

When the sharing electronic device is selected, the control unit 240 can form the communication link with the selected sharing electronic (e.g., the second electronic device 300) through the tethering in step 509. The control unit 240 performs the shared data communication by using the data quota of the selected sharing electronic device. For example, the first electronic device 200 can select the second electronic device 300 as the sharing electronic device, among the grouped electronic devices (i.e. the second and third electronic devices 300 and 400). For example, the first electronic device 200 can use 'A' communication service provider, and the second electronic device 300 can use B' communication service provider. At this time, the first electronic device 200 can perform the shared data communication by receiving the data from the second electronic device 300 which is the sharing electronic device, regardless of the communication service provider.

When the control unit 240 does not detect the shared data communication in step 503, the control unit 240 determines whether the data communication occurs in step 513. When the data communication occurs, the first electronic device 200 performs the data communication by using the data quota thereof. Next, the control unit 240 transmits the remaining data information decreased according to the performance of the data communication to the server 100 in step 511. At this time, the control unit 240 can release the communication link with the sharing electronic device.

Referring to FIG. 6, the server 100 stores the grouping information received from the first electronic device 200 in step 601. Here, the grouping information can include information wherein the first electronic device 200 is set as one group with at least one other electronic devices 300 and 400 so as to request the data sharing. In addition, the server 100 can receive the grouping information from each of the grouped electronic devices. Also, the server 100 can receive and store the remaining data information from each of the grouped electronic devices. Here, the electronic devices 200, 300 and 400 can use different communication service providers, respectively. Next, the server 100 can receive the request of the remaining data information of the grouped electronic device from the first electronic device 200 which is the requesting electronic device requesting the sharing of the data quota, in step 603. The server 100 can transmit the remaining data information of the grouped electronic devices 300 and 400 to the requesting electronic device (i.e., the first electronic device 200), in response to the request of the remaining data information, in step 605. When the server 100 receives the remaining data information according to the performance of the shared data communication from the requesting electronic device (i.e., the first electronic device 200) in step 607, the server 100 can update the remaining data information in step 609.

Meanwhile, when the server 100 does not detect the request of the remaining data information of the grouped electronic device in step 603, the server 100 determines whether the server 100 receives the remaining data quota information according to the performance of the data communication from the first electronic device 200 in step 607. When the server 100 receives the remaining data information, the server 100 detects the remaining data information in step 607. The server 100 can update the remaining data information in step 609.

Figure 7:
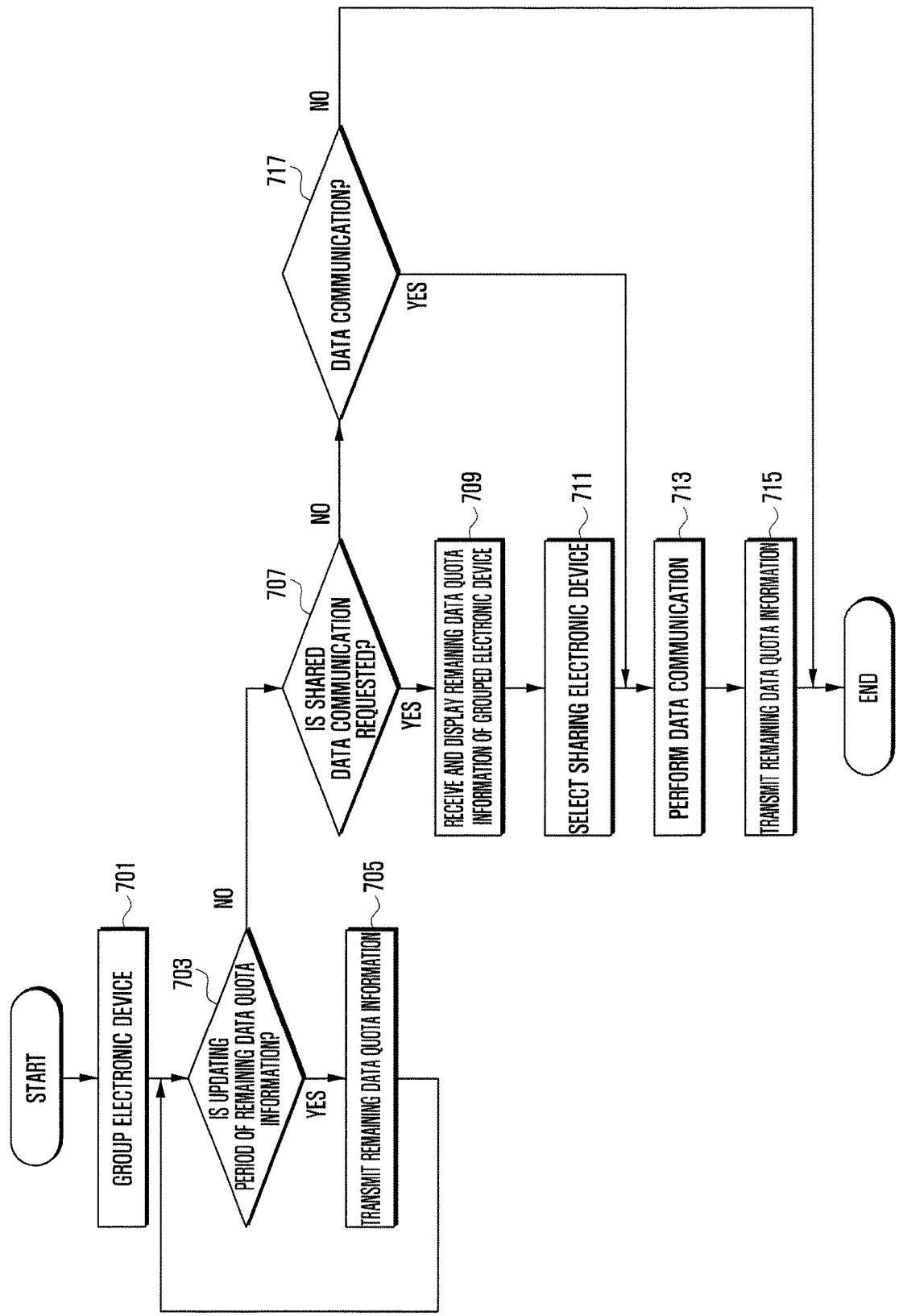
FIG. 7 is a flowchart for describing a procedure of performing the data communication by receiving the data quota by the electronic device according to an embodiment of the present invention.
Figure 8:
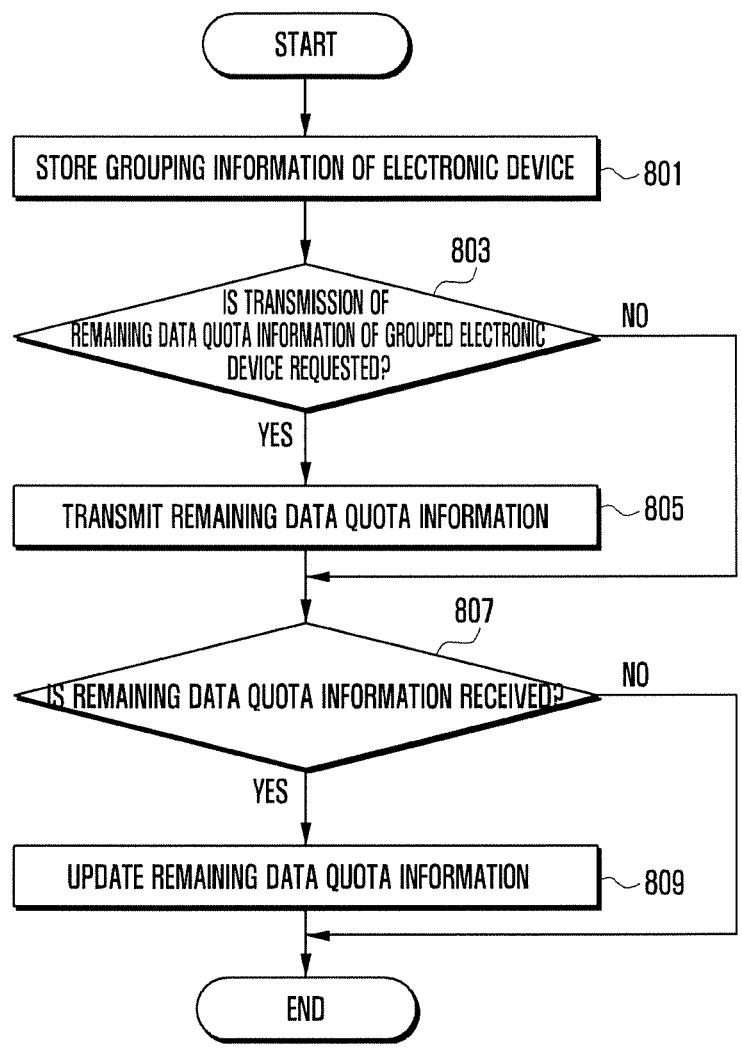
FIG. 8 is a flowchart for describing a procedure of responding to the request of the electronic device by the server according to an embodiment of the present invention.

FIG. 7 is a flowchart for describing a procedure of performing the data communication by receiving the data quota by the electronic device according to an embodiment of the present invention. FIG. 8 is a flowchart for describing a procedure of responding to the request of the electronic device by the server according to an embodiment of the present invention.

Referring to FIG. 7, the control unit 240 is grouped with at least one another electronic device in the user's setting step so as to share the data quota, and transmits the grouping information to the server 100. Next, the control unit 240 determines whether it is an updating period of the remaining data information of the grouped electronic device in step 703. When it is the updating period of the remaining data quota information, the control unit 240 can request the remaining data quota information of the grouped electronic devices to the server 100 in step 705. For example, the grouped electronic devices can be the second and third electronic devices 300 and 400. The control unit 240 can receive the requested remaining data information of at least one grouped electronic devices (i.e., the second and third electronic devices 300 and 400) from the server 100.

Meanwhile, when it is not the updating period of the remaining data quota information of the grouped electronic device, the control unit 240 determines whether the shared data communication is requested in step 707. When the shared data communication is requested, the control unit 240 can display the information of the remaining data thereof received from the server 100, in step 709. The control unit 240 selects the sharing electronic device for receiving the data quota in step 711 while displaying the received remaining data quota information. In some embodiments, the control unit 240 can select the terminal having the largest remaining data quota as the sharing electronic device, among the grouped electronic devices. When the sharing function of the sharing electronic device is not activated, the control unit 240 can select another electronic device as the sharing electronic device. Next, the control unit 240 forms the communication link with the selected sharing electronic device through the tethering connection and performs the shared data communication in step 713. That is, the control unit 240 can use the data quota of the sharing electronic device, when the control unit 240 performs the shared data communication. The sharing electronic device can allow another electronic device to use the data quota of the sharing electronic device. When the control unit 240 performs the data communication, the control unit 240 can cut the connection to the communication server of the sharing electronic device 300. The control unit 240 can transmit the remaining data information decreased according to the performance of the shared data communication to the server 100 in step 715.

Meanwhile, when the shared data communication is not requested, the control unit 240 determines whether the data communication is requested, in step 717. When the control unit 240 detects the data communication request, the control unit 240 can perform the data communication by using the data quota thereof in step 713. The data communication using the data quota of the control unit 240 can be performed in a state wherein the remaining data quota is larger than the predetermined amount. However, the data communication using the data quota of the control unit 240 is not limited thereto. For example, when the remaining data quota is not greater than the predetermined amount, the control unit 240 can perform the data communication by using the data quota thereof, on the assumption that the control unit 240 has the data quota. Next, the control unit 240 can transmit the remaining data quota information decreased after the performance of the data communication to the server 100 in step 715.

Referring to FIG. 8, the server 100 can store the grouping information received from the first electronic device 200 in step 801. Here, the grouping information is information of the electronic devices set as one group for sharing the data from at least one electronic device. In addition, the grouping information can include the remaining data information of the electronic devices set as one group. For example, when the first electronic device 200 is the requesting electronic device, the first electronic device 200 can set the second electronic device 300 and the third electronic device 400 as one group. In addition, the first electronic device 200 can transmit the grouping information set as one group to the server 100. Thus, the server 100 can store the data quota received from the first electronic device 200, together with the grouping information and the remaining data quota information.

The server 100 can receive the request of the remaining data of the grouped electronic devices from the first electronic device 200. The request of the remaining data quota information can occur in a period where the first electronic device 200 updates the remaining data quota information of the grouped electronic devices 300 and 400. Here, the period where the remaining data quota information is updated can be set by the user, or can be set from a communication network. Thus, when it is the updating period of the remaining data quota information of the grouped electronic devices 300 and 400 (that is, when the remaining data quota information of the grouped electronic devices 300 and 400 is requested), the server 100 can detect the request in step 803. The server 100 transmits the remaining data quota information of the grouped electronic devices 300 and 400 to the first electronic device 200 in step 805. Next, when the server 100 receives the remaining data quota information from the first electronic device 200 in step 807, the server 100 can update the remaining data quota information in step 809. Through such a process, the server 100 may store the grouping information and the remaining data quota information of at least one grouped electronic device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating an electronic device for sharing a data quota in an electronic device, the method comprising:
   generating, by a first electronic device, a group comprising second electronic devices associated with the first electronic device;
   transmitting, in response to the generating, information on the generated group to a server, wherein the server sets the group to use data usage information;
   requesting, when a data usage quota of the first electronic device is equal to or larger than a predetermined value, data usage information to the server, wherein the predetermined value is a value set for triggering sharing of data usage;
   receiving, when outside an updating period, data usage information of each second electronic device included in the group from the server in response to requesting the data usage information, wherein the updating period includes a periodic update of data usage information to the electronic device;
   identifying whether the second electronic devices included in the group are located within a range of a local wireless network of the first electronic device on a basis of a position of the first electronic device;
   displaying data usage information of the second electronic devices located within the local wireless network range of the first electronic device according to an outcome of the identifying;
   selecting an electronic device having a largest remaining data quota among the second electronic devices located within the local wireless network range of the first electronic device; and
   performing a data communication using the local wireless network with the electronic device having the largest remaining data quota.

2. The method of claim 1, wherein the first electronic device downloads data from a network of the selected electronic device when a download request is received from another electronic device in the group, and transmits remaining data quota information to a server when the data downloading is completed.

3. The method of claim 1, further comprising:
   selecting an other electronic device with a second largest remaining data quota, when the electronic device with the largest remaining data quota is not available.

4. The method of claim 3, wherein the selected electronic device has a data usage quota equal to or larger than a size of the data to be downloaded.

5. An electronic device comprising:
   a wireless transceiver configured to:
      transmit or receive a signal or data;
   a display configured to display remaining data information of a plurality of other electronic devices provided from a server and the electronic device; and
   a processor configured to control to:
      generate a group comprising second electronic devices associated with the electronic device;
      control the wireless transceiver to transmit information on the generated group to a server, wherein the server sets the group to use data usage information, and to request, when a data usage quota of the electronic device is equal to or larger than a predetermined value, data usage information to the server, wherein the predetermined value is a value set for triggering sharing of data usage;
      receive, when outside an updating period, data usage information of each second electronic device included in the group from the server through the wireless transceiver in response to requesting the data usage information, wherein the updating period includes a periodic update of data usage information to the electronic device;
      identify whether the second electronic devices included in the group are located within a range of a local wireless network of the electronic device on a basis of a position of the electronic device;
      display data usage information of the second electronic devices on the display located within the local wireless network range of the electronic device according to an outcome of the identifying;
      select an electronic device having a largest remaining data quota among the second electronic devices located within the local wireless network range of the electronic device; and
      perform a data communication using the local wireless network with the electronic device having the largest remaining data quota.

6. The electronic device of claim 5, wherein the processor is further configured to and select an other electronic device with a second largest remaining data quota, when the electronic device with the largest remaining data quota is not available.

7. The electronic device of claim 6, wherein the selected electronic device has a data usage quota equal to or larger than a size of the data to be downloaded.

* * * * *